United States Patent
Miranda (10) Patent No.: US 9,909,564 B2
(45) Date of Patent: Mar. 6, 2018

(54) SUPERVISION OF CONTROLLER INSTABILITY IN A WIND TURBINE

(75) Inventor: Erik Carl Lehnskov Miranda, Randers SV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 877 days.

(21) Appl. No.: 13/997,582

(22) PCT Filed: Dec. 20, 2011

(86) PCT No.: PCT/DK2011/050501
§ 371 (c)(1),
(2), (4) Date: Jun. 24, 2013

(87) PCT Pub. No.: WO2012/083962
PCT Pub. Date: Jun. 28, 2012

(65) Prior Publication Data
US 2013/0287568 A1 Oct. 31, 2013

Related U.S. Application Data

(60) Provisional application No. 61/426,539, filed on Dec. 23, 2010.

(30) Foreign Application Priority Data

Dec. 23, 2010 (DK) .................................. 2010 70578

(51) Int. Cl.
*F03D 7/02* (2006.01)
*F03D 7/04* (2006.01)

(52) U.S. Cl.
CPC ......... *F03D 7/0296* (2013.01); *F03D 7/0224* (2013.01); *F03D 7/043* (2013.01);
(Continued)

(58) Field of Classification Search
CPC ...... F03D 7/0296; F03D 7/046; F03D 7/0224; F03D 7/043; F05B 2260/96; F05B 2270/327; F05B 2270/1095; F05B 2270/328; F05B 2270/309; F05B 2260/80; Y02E 10/723
USPC ........................................................ 700/287
See application file for complete search history.

(56) References Cited

U.S. PATENT DOCUMENTS 6,737,984 B1 * 5/2004 Welles, II ................ H04Q 9/00
340/12.33
6,876,099 B2 * 4/2005 Wobben ................ F03D 7/0296
290/44

(Continued)

FOREIGN PATENT DOCUMENTS

| EP | 1345102 A1 | 9/2003 |
|---|---|---|
| EP | 1719910 A1 | 11/2006 |
| EP | 1816347 A1 | 8/2007 |

OTHER PUBLICATIONS

Danish Search Report, PA 2010 70578, dated Jul. 19, 2011.
International Search Report and Written Opinion, PCT/DK2011/050501.

*Primary Examiner* — Kenneth M Lo
*Assistant Examiner* — Alan Chu
(74) *Attorney, Agent, or Firm* — Patteron + Sheridan LLP (57) ABSTRACT

A wind turbine including a controller configured to periodically enter an Eigen frequency detection mode in which the controller gain is incremented in a controlled manner to detect the Eigen frequencies. During normal operations, the controller output may be monitored to detect the Eigen frequency which, if detected, may allow damage control operations to be undertaken.

21 Claims, 5 Drawing Sheets

(52) U.S. Cl.
CPC .......... *F03D 7/046* (2013.01); *F05B 2260/80* (2013.01); *F05B 2260/96* (2013.01); *F05B 2270/1095* (2013.01); *F05B 2270/309* (2013.01); *F05B 2270/327* (2013.01); *F05B 2270/328* (2013.01); *Y02E 10/723* (2013.01)

(56) References Cited

U.S. PATENT DOCUMENTS

| | | | |
|---|---|---|---|
| 7,809,668 B1* | 10/2010 | Smith ................ | G05B 13/0275 700/42 |
| 2004/0108729 A1 | 6/2004 | Wobben | |
| 2007/0176428 A1* | 8/2007 | Nagao ................... | F03D 7/0296 290/44 |
| 2007/0268068 A1 | 11/2007 | Yutkowitz | |
| 2010/0135789 A1* | 6/2010 | Zheng ................... | F03D 7/0224 416/1 |
| 2010/0143117 A1* | 6/2010 | Xiong ................... | F03D 7/0296 416/1 |
| 2010/0241280 A1* | 9/2010 | Garcia Barace ...... | F03D 7/0224 700/287 |
| 2011/0140425 A1* | 6/2011 | Staedler ................ | F03D 7/0248 290/44 |
| 2011/0158806 A1* | 6/2011 | Arms .................... | F03D 1/0658 416/31 |
| 2011/0285532 A1* | 11/2011 | Hedin ................. | G01M 13/045 340/540 |

\* cited by examiner

FIG. 7 ary generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

SUPERVISION OF CONTROLLER INSTABILITY IN A WIND TURBINE

FIELD OF THE INVENTION

Embodiments of the invention are generally related to wind turbines, and more specifically to avoiding damage to the wind turbine caused due to instability.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle.

Wind turbines may include a control system or systems comprising sensors, actuators, along with hardware and software for processing sensor signals received from the sensors and generating output signals for the actuators. Exemplary sensors may include anemometers, wind vanes, rotor speed sensors, electrical power sensors, pitch angle sensors, vibration sensors, and the like. Advanced control algorithms may be implemented in the control systems to satisfy multiple objectives such as maximizing energy capture, relieving loads on structures such as blades, regulating generator speed, and the like. Control systems in a wind turbine tend to be closed loop control systems, in which a closed loop controller monitors an output value of the system, and regulate one or more input values based on the monitored output value to achieve a desired output value.

SUMMARY OF THE INVENTION

Embodiments of the invention are generally related to wind turbines, and more specifically to avoiding damage to the wind turbine caused due to instability.

One embodiment of the invention provides a method for operating a controller in a wind turbine. The method generally comprises determining a closed loop Eigen frequency of the controller, monitoring an amplitude of a parameter controlled by the controller at or near the closed loop Eigen frequency, and upon detecting that the amplitude of the parameter is above a predefined threshold, initiating at least one action for mitigating damage to components of a wind turbine.

Another embodiment of the invention provides a computer readable storage medium comprising a program product which, when executed by a processor, is configured to operate a controller of a wind turbine. The operation generally comprises determining a closed loop Eigen frequency of the controller, monitoring an amplitude of a parameter controlled by the controller at or near the closed loop Eigen frequency, and upon detecting that the amplitude of the parameter is above a predefined threshold, initiating at least one action for mitigating damage to components of a wind turbine.

Yet another embodiment of the invention provides a wind turbine comprising a controller configured to control at least one operational parameter of the wind turbine. The controller is generally configured to determine a closed loop Eigen frequency of the controller, monitor an amplitude of a parameter controlled by the controller at or near the closed loop Eigen frequency, and upon detecting that the amplitude of the parameter is above a predefined threshold, initiate at least one action for mitigating damage to components of a wind turbine.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a wind turbine comprising a controller configured to periodically enter an Eigen frequency detection mode in which the controller gain is incremented in a controlled manner to detect the Eigen frequencies. During normal operations, the controller output may be monitored to detect the Eigen frequency which, if detected, may allow damage control operations to be undertaken.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
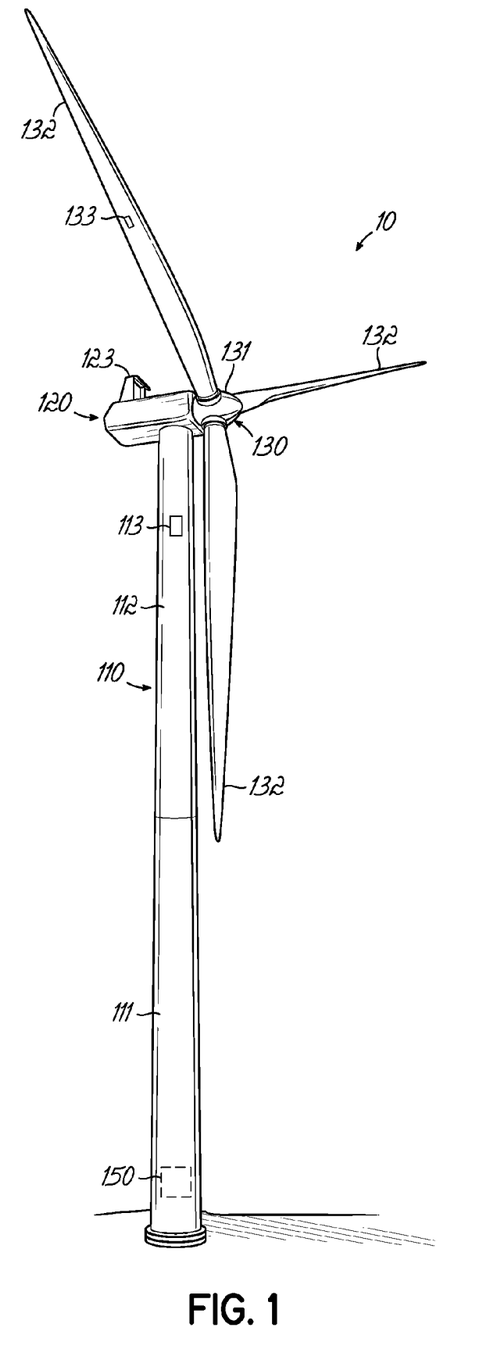
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 may include a tower 110, a nacelle 120, and a rotor 130. In one embodiment of the invention the wind turbine 100 may be an on shore wind turbine.

However, embodiments of the invention are not limited only to on shore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any reasonable material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The movement of the blades may also cause the shaft of the wind turbine 100 to rotate. The nacelle 120 may include one or more components configured to convert aero-mechanical energy of the blades to rotational energy of the shaft, and the rotational energy of the shaft into electrical energy.

The wind turbine 100 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high wind gusts. In such situations, the blades may be pitched to reduce the loads, thereby preventing damage to the blades.

FIG. 1 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 100. In some embodiments of the invention, the accelerometer 113 may be placed on the nacelle 120.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may also detect a speed of the wind. Wind speed data may be used to determine an appropriate pitch angle that allows the blades 132 to capture a desired amount of energy from the wind. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100.

While a strain gauge 133, accelerometer 113, and wind sensor 123 are described herein, embodiments of the invention are not limited to the aforementioned types of sensors. In general, any type and number of sensors may be placed at various locations of the wind turbine 100 to facilitate capturing data regarding structural health, performance, damage prevention, acoustics, and the like. For example, a pitch angle sensor may be placed at or near a wind turbine blade to determine a current pitch angle of the blade.

Figure 2:
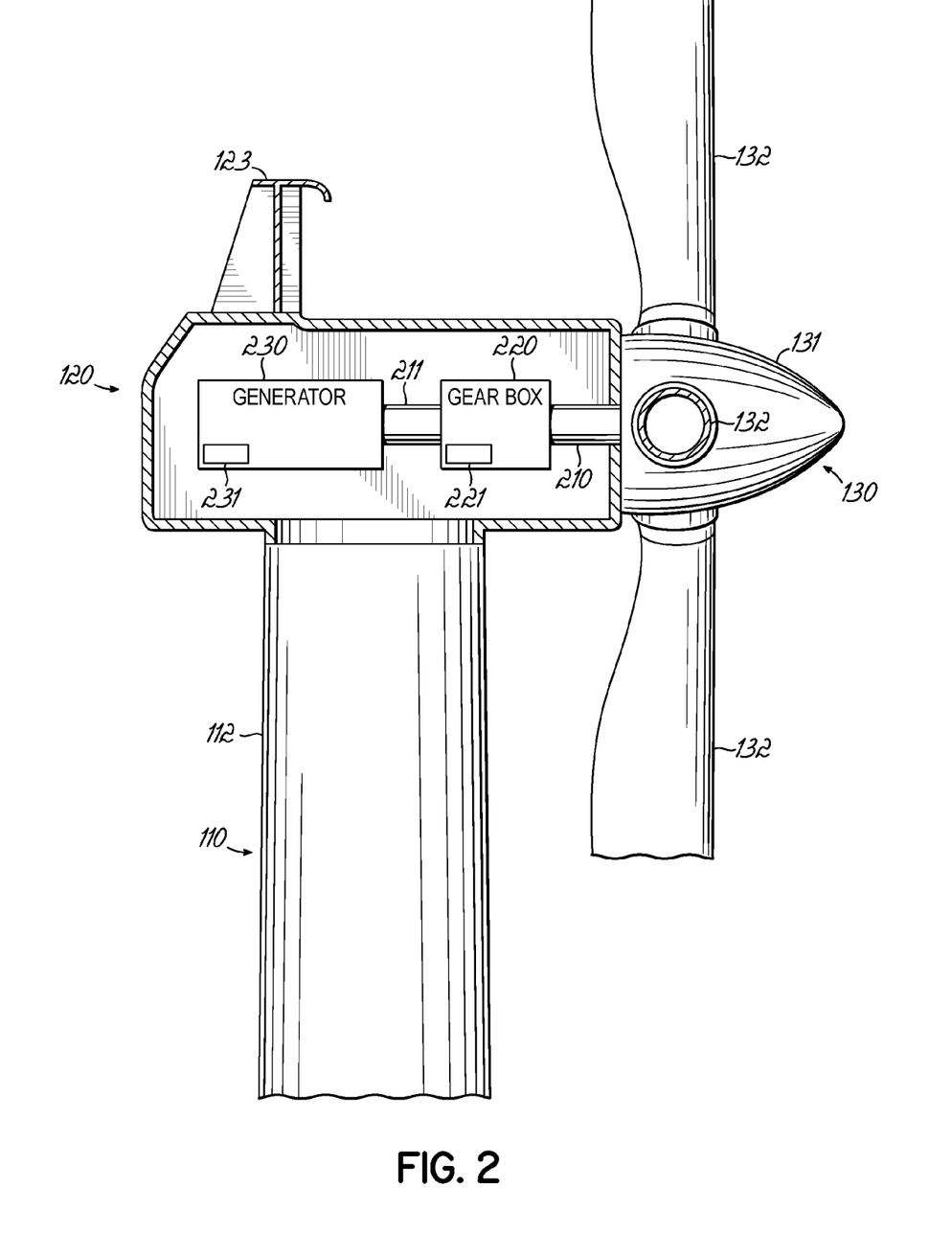
FIG. 2 illustrates an exemplary nacelle according to an embodiment of the invention

FIG. 2 illustrates a more detailed view of a nacelle 120 according to an embodiment of the invention. As illustrated in FIG. 2, the nacelle 120 may include at least a low speed shaft 210, a high speed shaft 211, a gearbox 220, and a generator 230. In one embodiment, the low speed shaft 210 may couple the gearbox 230 to the hub 130, as illustrated in FIG. 2. The gearbox 230 may rely on gear ratios in a drive train to provide speed and torque conversions from the rotation of the low speed shaft 210 to the rotor assembly of the generator 230 via the high speed shaft 211.

In an alternative embodiment, the low speed shaft 210 may directly connect the hub 130 with a rotor assembly of the generator 230 so that rotation of the hub 130 directly drives the rotor assembly to spin relative to a stator assembly of the generator 230. In embodiments where the low speed shaft 210 is directly coupled to the hub 130, the gear box 220 may not be included, thereby allowing the nacelle 120 to be smaller and/or lighter.

The generator 230 may be configured to generate a three phase alternating current based on one or more grid requirements. In one embodiment, the generator 230 may be a synchronous generator. Synchronous generators may be configured to operate at a constant speed, and may be directly connected to the grid. In some embodiments, the generator 230 may be a permanent magnet generator. In alternative embodiments, the generator 230 may be an asynchronous generator, also sometimes known as an induction generator. Induction generators may or may not be directly connected to the grid. For example, in some embodiments, the generator 230 may be coupled to the grid via one or more electrical devices configured to, for example, adjust current, voltage, and other electrical parameters to conform with one or more grid requirements. Exemplary electrical devices include, for example, inverters, converters, resistors, switches, and the like.

Embodiments of the invention are not limited to any particular type of generator or arrangement of the generator and one or more electrical devices associated with the generator in relation to the electrical grid.

Any suitable type of generator including (but not limited to) induction generators, permanent magnet generators, synchronous generators, or the like, configured to generate electricity according to grid requirements falls within the purview of the invention.

In some embodiments, a plurality of sensors may be included in the nacelle 120 to monitor the structural health and performance of the components therein, the quality of the power generated, and the like. For example, a sensor 221 may be placed in the gear box 220 to detect mechanical strain and wear/tear of the gear box 220. A sensor 231 may be placed in the generator 230 to detect generator speed, power generation, or the like.

Figure 3:
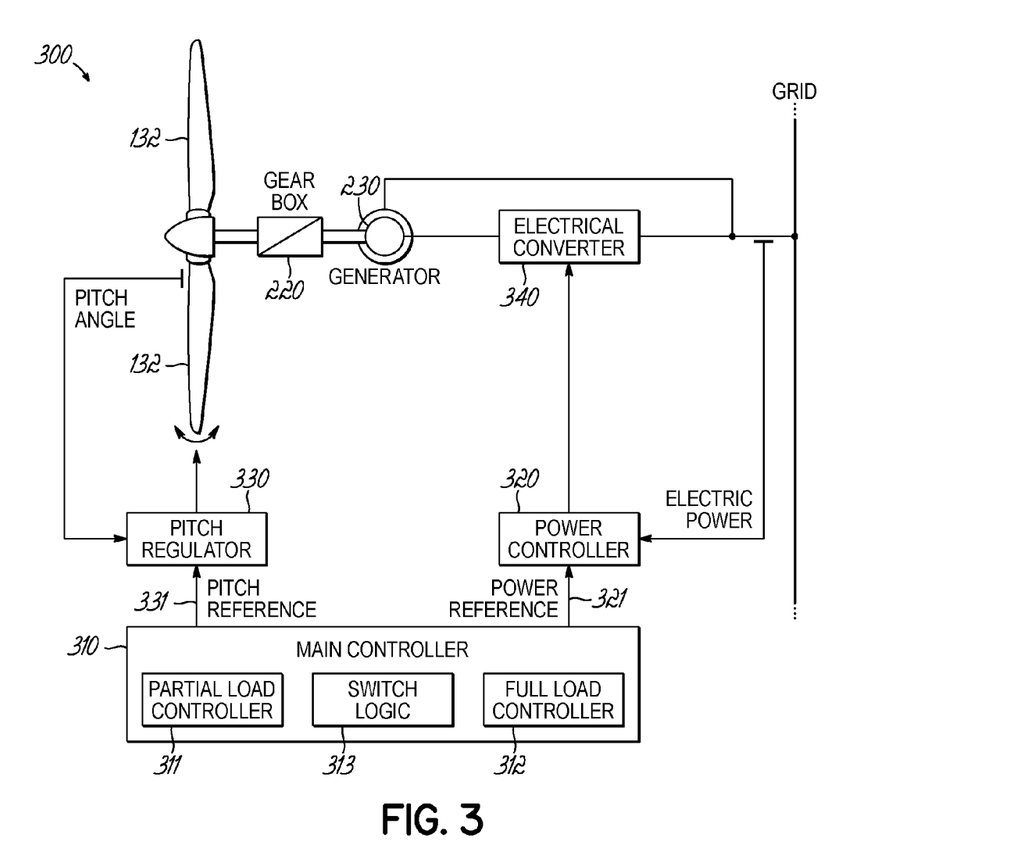
FIG. 3 illustrates an exemplary control system of a wind turbine according to an embodiment of the invention.

FIG. 3 illustrates an exemplary control system 300 for a wind turbine, according to an embodiment of the invention. As illustrated in FIG. 3, the control system 300 may include a main controller 310, a power controller 320, and a pitch regulator 330. The main controller 310 may comprise the overall control loops and most of the supervision algorithms for operating the wind turbine. Specifically, in some embodiments, the main controller may ensure that the wind turbine maximizes the amount of produced energy, limits the mechanical loads on the turbine within design limits, limits acoustical noise, maintains a high power quality, shuts down during emergencies, or the like. In one embodiment, the main controller 310 may be configured to generate the power reference signal 321 and the pitch reference signal 331, as will be discussed in greater detail below.

The main controller may include a partial load controller 311, a full load controller 312, and switch logic 313, as illustrated in FIG. 3. The partial load controller 311 may control operation of the wind turbine when the wind speed is below a rated wind speed. In such situations, the switch logic 313 may activate the partial load controller 311, which may ensure that the turbine produces electrical energy with optimum efficiency. On the other hand, if the wind speed is at or above the rated wind speed, the switch logic may activate the full load controller 312, which may be configured to limit power generation to the rated power.

The power controller 320 may be configured to control an electrical converter 340 of the wind turbine, as illustrated in FIG. 3. The electrical converter 340 may be configured to convert variable frequency output generated by the generator 230 to a fixed frequency appropriate for the grid or a load. Therefore, by controlling the electrical converter 340, the power controller 320 may control the power output from the wind turbine.

As illustrated in FIG. 3, the power controller 320 may receive a power reference signal 321 from the main controller 310. The power reference signal 321 may indicate a power level to be output by the wind turbine. The specific power level to be output may be determined by, for example, grid codes, demand for electricity at a given time, generator speed, derating demands to protect wind turbine components, and the like.

The pitch regulator 330 may be configured to adjust a pitch angle of at least one blade 132 of the wind turbine. As illustrated in FIG. 3, the pitch regulator may receive a pitch reference value 331 from the main controller 310. The pitch regulator 330 may adjust the pitch angle of the at least one blade based on the pitch reference value 331 received from the main controller 310. While a main controller 310, power controller 320, and pitch regulator 330 are described above, embodiments of the invention are not limited only to the controllers described herein. Rather, any type of controller used within a wind turbine falls within the purview of embodiments of the invention.

Figure 4:
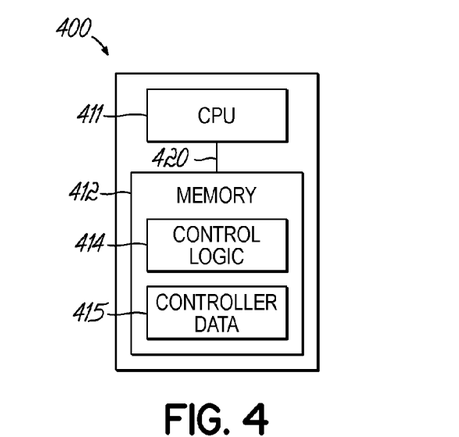
FIG. 4 illustrates an exemplary controller according to an embodiment of the invention.

FIG. 4 depicts a block diagram of an exemplary controller 400 according to an embodiment of the invention. The controller 400 may represent any one of the main controller 310, partial load controller 311, full load controller 312, power controller 320, pitch regulator 330, or the like. The controller 400 may include a Central Processing Unit (CPU) 411 connected via a bus 420 to a memory 412, as illustrated in FIG. 4.

The memory 412 is preferably a random access memory sufficiently large to hold the necessary programming and data structures of the invention.

While memory 412 is shown as a single entity, it should be understood that memory 412 may in fact comprise a plurality of modules, and that memory 412 may exist at multiple levels, from high speed registers and caches to lower speed but larger DRAM chips.

Memory 412 is also shown comprising control logic 414 which, when executed by CPU 411, performs operation for controlling one or more operational parameters of a wind turbine. In one embodiment, the control logic 414 may perform operations for detecting wind turbine instability and undertake corrective measures to prevent damage to the wind turbine. While the control logic 414 is shown as software stored in memory 412 in FIG. 4, in alternative embodiments, the control logic may be implemented as hardware of the controller 400.

The memory 412 may also include controller data 415. Controller data 415 may include information regarding performance characteristics of a wind turbine, thresholds and ranges of operational parameter values at which wind turbine instability occurs, and the like. Examples of controller data 415 are provided in greater detail below.

In one embodiment of the invention, the controllers in a wind turbine may be a part of a closed loop controller system. In general, closed loop controller systems include controllers that monitor an output parameter of the system, and regulate one or more input or control values based on the monitored output value to achieve a desired output value. For example, the pitching system of a wind turbine may include a pitch regulator (e.g., pitch regulator 330), and a hydraulic blade pitch actuator for turning the blades. The pitch regulator 330 may receive a pitch reference signal 331 from the main controller 310, which may indicate a desired blade pitch angle. The pitch regulator 330 may also receive a measured pitch angle from a pitch angle sensor (not shown). Based on the measured pitch angle and a desired pitch angle, the pitch regulator may generate one or more input/control signals to the pitch actuator to move the blades so that the desired pitch angle is achieved.

In one embodiment, the pitching system of the wind turbine may be a dynamic system. For example, the pitch reference value (or desired blade pitch angle) may dynamically change due to a variety of reasons such as fluctuating wind speeds, power demand, and the like. The fluctuating pitch reference may cause the pitch regulator to dynamically change the blade pitch angle to capture the desired power from the wind.

Figure 5A:
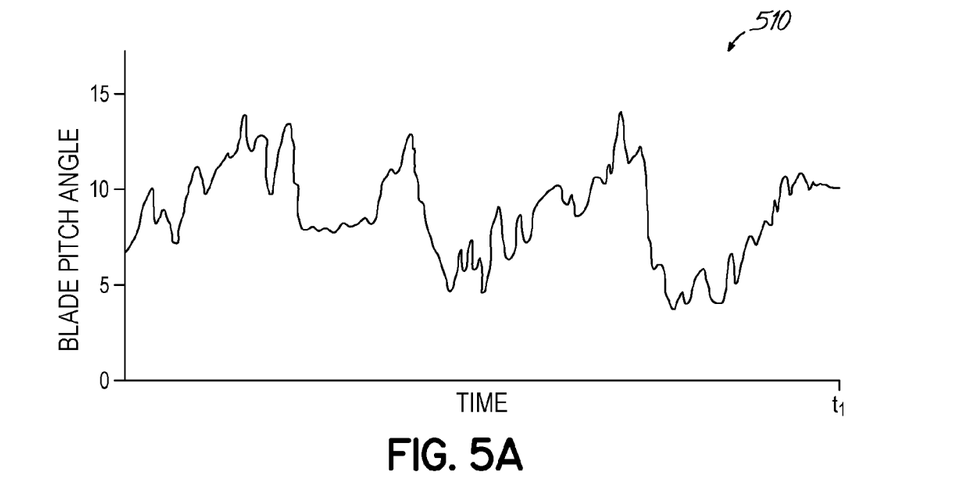
FIGS. 5A-B illustrates exemplary graphs of controller data according to an embodiment of the invention.
Figure 5B:
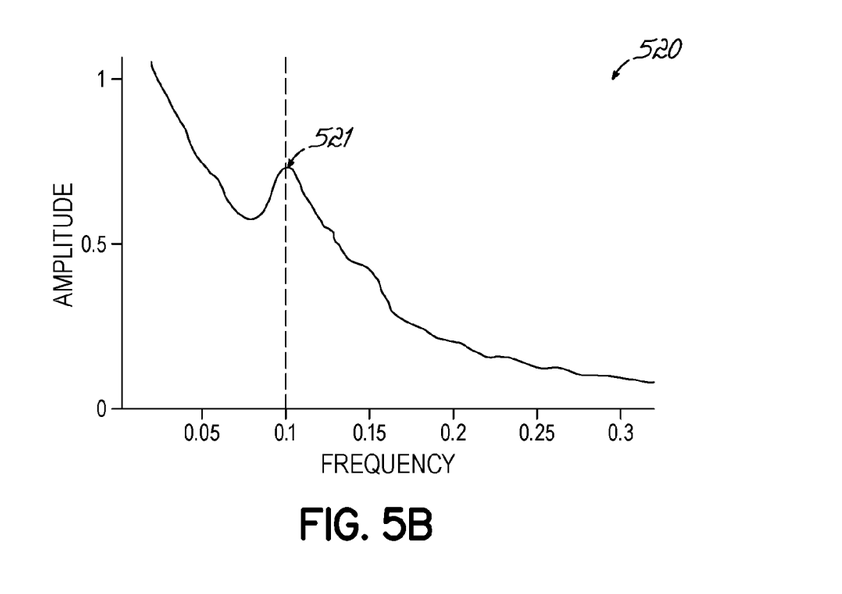

In some embodiments, an instability in the pitch regulator or main controller may cause the blade and pitch to be adjusted at a resonant frequency called the closed loop Eigen frequency, which may cause damage to components of the wind turbine. FIGS. 5A-B illustrate exemplary graphs that illustrate controller instability according to an embodiment of the invention. A first graph 510 in FIG. 5A illustrates exemplary variations in the pitch angle of a wind turbine blade over a period of time t1. As shown in graph 510, the pitch angle of the wind turbine may vary between 0 and 15 degrees over the time period t1. As described previously, the variations may occur due to adjustments in the pitch reference value to account for changing environmental conditions such as wind speed.

A second graph 520 in FIG. 5B illustrates a bode plot of frequencies at which the pitch angle is changed in the first graph 510. As illustrated in the second graph 520, a peak 521 in the amplitude is shown at a frequency of about 0.1 Hz. The peak 521 may represent instability in the pitch regulator caused due to an excessively high controller gain. If the pitch regulator were to adjust the pitch angle of the wind turbine blade at or near frequencies that cause controller instability, one or more catastrophic events may cause damage to the components of the wind turbine. For example, in one embodiment, pitching of the blades at an Eigen frequency may introduce high fatigue loads on the blades, which may cause damage to pitch system components, blade bearings, the drive train, the blades, the tower, and the like.

Embodiments of the invention provide methods and apparatus to avoid damage to wind turbine components caused due to controller instability.

In one embodiment of the invention, the control logic (e.g., control logic 414 of FIG. 4) may periodically enter a Eigen frequency detection mode to determine a closed loop Eigen frequency of the controller. For example, the control logic may increase or decrease the controller gain in a stepped manner by predefined amounts. After each increase or decrease, the control logic may operate for a predefined period of time before the next increase or decrease. For example, in one embodiment, the controller gain may be increased by 10% every 10 minutes. However, in alternative embodiments, any amount of gain increase or decrease and any predefined period may be implemented The control logic may capture the data regarding a controlled parameter, e.g., the pitch angle or generator speed during the interval between two successive gain adjustments. The data may be stored, for example, in the controller data 415 of memory 412 (see FIG. 4). An example of the data regarding the controlled parameter that may be captured by the control logic is presented herein in graph 510 of FIG. 5A.

In one embodiment, after sweeping through a predefined range of controller gain, the control logic may be configured to perform Fast Fourier Transformation (FFT) analysis on the data regarding the controlled parameter to obtain FFT data, e.g., the bode plot 520 of FIG. 5B. The FFT data may be analysed to identify peaks in amplitude, which may indicate controller instability. For example, in one embodiment, if the amplitude at a first frequency is more than e.g. 10% higher than one or more neighboring frequencies, this may indicate controller instability at the first frequency. Accordingly, the first frequency may be determined to be an Eigen frequency. In some embodiments, the Eigen frequencies may lie in a range between 0.05 and 0.2 Hz. After the detection of the Eigen frequency, the control logic may exit the Eigen frequency detection mode, and adjust the controller gain back to its original value. While FFT is described herein as an exemplary method for performing analysis of data of the controlled parameter, embodiments of the invention are not limited only to FFT analysis. In alternative embodiments, any reasonable method may be used to identify the frequencies that indicate controller instability.

In one embodiment, the control logic may be configured to enter the Eigen frequency detection mode at regular intervals, e.g., every month, every week, every quarter, and the like. The adjustment of the gain during the Eigen frequency detection mode will not damage the components of the wind turbine because the gain values are set for a small amount of time and are adjusted in a controlled manner. Furthermore, the operations performed in the Eigen Frequency detection mode may be configured to detect specific Eigen frequencies for specific turbines. In other words, different turbines may have different Eigen frequencies because of mechanical variations, climatic differences, different operating parameters, and the like. By providing an Eigen frequency detection mode, each turbine may determine its own Eigen frequency at a given time.

After the Eigen frequencies are determined, during normal operation, the control logic may continuously monitor the frequency of oscillations of a respective turbine operational parameter, e.g., the pitch angle of a blade, to determine whether the parameter is oscillating at the determined Eigen frequency. If the parameter is oscillating at the Eigen frequency, the control logic may determine the amplitude level at the Eigen frequency. If the amplitude level is greater than a predefined threshold value, the control logic may initiate one or more measures to obviate damage to turbine components.

For example, in one embodiment, if the amplitude (e.g., amplitude of pitch angle, generator speed, rotor speed, and the like) level is greater than the threshold value, the control logic may shut down the wind turbine. Alternatively, in some embodiments, the control logic may continue to operate the turbine in a safe mode configured to avoid damage components of the turbine. In some embodiments, if the amplitude is greater than the threshold value, the gain may be dynamically adjusted by the control logic.

Figure 6:
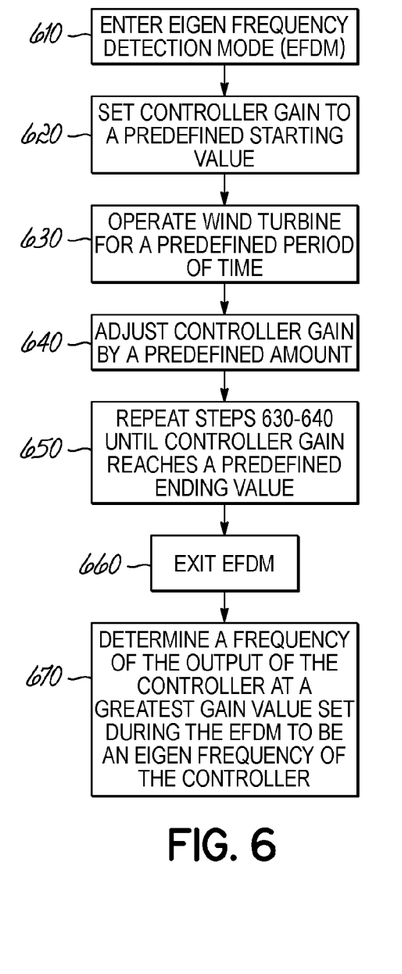
FIG. 6 is a flow diagram of exemplary operations performed by wind turbine controller according to an embodiment of the invention.

FIG. 6 is a flow diagram of exemplary operations performed by the control logic of a wind turbine controller according to an embodiment of the invention. The operations may begin in step 610 by entering an Eigen frequency detection mode. While in the Eigen frequency detection mode, the control logic may set the controller gain at a predefined starting value, in step 620. In step 630, the control logic may operate the wind turbine for a predefined period of time, wherein a value of an output of the controller is recorded during the predefined time period. In step 640, the control logic may adjust the controller gain by a predefined amount at the end of the predefined time period. In step 650, the steps 630 and 640 may be repeated until the controller gain reaches a predefined ending value. In step 660, the controller may exit the Eigen frequency detection mode. In step 670, the control logic may determine a frequency of the output of the controller at a greatest gain value set during the Eigen frequency detection mode to be an Eigen frequency of the controller.

One skilled in the art should recognize that the description of detection of instability in a pitch regulator or controller, and operations to avoid damage to the pitching system, are provided herein for exemplary purposes only. Embodiments of the invention are applicable more generally to detection and avoidance of controller instability in any type of closed loop controller in a wind turbine, e.g., the power controller 320, partial load controller 311, full load controller 312, illustrated in FIG. 3.

For example, in one embodiment, instability in the power controller 320 may be analysed based on, for example, the generator speed. In other words, the gain of the power controller 320 may be swept across a predefined range in fixed increments to detect the Eigen frequency, which may occur at the greatest gain value. Thereafter, the generator speed may be monitored during normal operation to detect whether the Eigen frequency is detected. When the frequency is at or near the Eigen frequency, one or more damage mitigation operations such as, for example, shut down of the turbine, adjustment in gain, altering an operational mode of the turbine (e.g., safe mode), may be undertaken.

Figure 7:
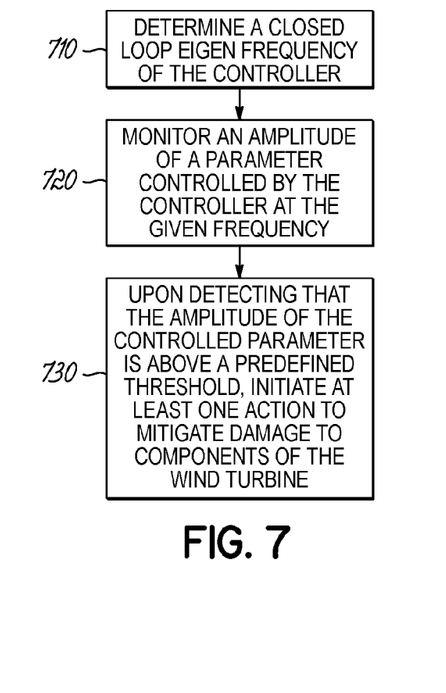
FIG. 7 is another flow diagram of exemplary operations performed by a controller of a wind turbine, according to an embodiment of the invention.

FIG. 7 is a flow diagram of exemplary operations performed by a controller during normal operation, according to an embodiment of the invention. As illustrated in FIG. 7, the operations may begin in step 710 be determining a closed loop Eigen frequency of a controller. In one embodiment, the closed loop Eigen frequency may be determined via, for example, the method steps described in FIG. 6. Alternatively, the closed loop Eigen frequency may be theoretically calculated based on an analysis of the controller circuit, one or more environmental conditions, or the like. In still other embodiments, the Eigen frequency may be a predefined value stored in the controller memory, e.g., memory 412, by, for example, a manufacturer of the controller.

In step 720, the controller may monitor an amplitude of an operational parameter controlled by the controller at or near a given frequency. For example, the amplitude of the operational parameter may be monitored at or near the closed loop Eigen frequency. Referring back to FIG. 5B, for example, the controller may monitor the amplitude of the pitch angle at or near 0.1 Hz, e.g., between the range of 0.05-0.2 Hz. In step 730, upon determining that the amplitude of the operational parameter at the given frequency is greater than a predefined threshold, the controller may initiate at least one action for mitigating damage to components of a wind turbine. For example, referring back to FIG. 5B, if the amplitude is greater than 0.75, the action for mitigating damage may be undertaken. Exemplary operations for mitigating damage to the turbine may be, for example, shut down of the turbine, operating the turbine in a safe mode, adjusting a gain of the controller, and the like.

By providing methods for detecting and avoiding controller instability, embodiments of the invention provide several advantages to the operation, maintenance of wind turbines. For example, the Eigen frequency at which controller instability may occur may change over time due to, for example, environmental changes, replacement or alteration of wind turbine parts, and the like. By executing the exemplary methods for detecting controller instability, embodiments of the invention may allow determining of specific frequencies related to controller instability at any given time for any given turbine. The specific knowledge acquired from regular determining of frequencies associated with controller instability may be used to devise customized measures for avoiding damage individually for each turbine.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept

What is claimed is:

1. A method for operating a controller in a wind turbine, comprising:
   determining a closed loop Eigen frequency of the controller, wherein the closed loop Eigen frequency is caused by an instability of the controller;
   monitoring an amplitude of a control signal of a component in the wind turbine outputted by the controller at or near the closed loop Eigen frequency; and
   upon detecting that the amplitude of the control signal is above a predefined threshold, initiating at least one action for mitigating damage to components of the wind turbine.

2. The method of claim 1, wherein determining the closed loop Eigen frequency comprises:
   entering an Eigen frequency detection mode;
   while in the Eigen frequency detection mode:
      (a) setting a controller gain at a predefined starting value;
      (b) operating the wind turbine for a predefined period of time, wherein a value of the control signal is recorded during the predefined time period;
      (c) adjusting the controller gain by a predefined amount at the end of the predefined time period; and
      (d) continuously repeating steps (b) and (c) until the controller gain reaches a predefined ending value; and
   based on the recorded values of the control signal in the Eigen frequency detection mode, determining a frequency of the control signal at a greatest gain value set during the Eigen frequency detection mode to be an Eigen frequency of the controller.

3. The method of claim 1, wherein the at least one action comprises shutting down the wind turbine.

4. The method of claim 1, wherein the at least one action comprises operating the wind turbine in a safe mode.

5. The method of claim 1, wherein the at least one action comprises adjusting a gain of the controller.

6. The method of claim 1, wherein the control signal comprises a control setting for at least one of:
   setting a pitch angle of at least one blade of the wind turbine; and
   setting a generator speed of the wind turbine.

7. The method of claim 1, wherein determining the closed loop Eigen frequency comprises retrieving a predefined Eigen frequency stored in a memory of the controller.

8. A computer readable storage medium comprising a program product which, when executed by a processor, is configured to operate a controller of a wind turbine, the operation comprising:
   determining a closed loop Eigen frequency of the controller, wherein the closed loop Eigen frequency is caused by an instability of the controller;
   monitoring an amplitude of a control signal of a component in the wind turbine outputted by the controller at or near the closed loop Eigen frequency; and
   upon detecting that the amplitude of the control signal is above a predefined threshold, initiating at least one action for mitigating damage to components of the wind turbine.

9. The computer readable storage medium of claim 8, wherein determining the closed loop Eigen frequency comprises:
   entering an Eigen frequency detection mode;
   while in the Eigen frequency detection mode:
      (a) setting a controller gain at a predefined starting value;

(b) operating the wind turbine for a predefined period of time, wherein a value of the control signal is recorded during the predefined time period;

(c) adjusting the controller gain by a predefined amount at the end of the predefined time period; and (d) continuously repeating steps (b) and (c) until the controller gain reaches a predefined ending value; and based on the recorded values of the control signal in the Eigen frequency detection mode, determining a frequency of the control signal at a greatest gain value set during the Eigen frequency detection mode to be an Eigen frequency of the controller.

10. The computer readable storage medium of claim 8, wherein the at least one action comprises shutting down the wind turbine.

11. The computer readable storage medium of claim 8, wherein the at least one action comprises operating the wind turbine in a safe mode.

12. The computer readable storage medium of claim 8, wherein the at least one action comprises adjusting a gain of the controller.

13. The computer readable storage medium of claim 8, wherein the control signal comprises a control setting for at least one of:

setting a pitch angle of at least one blade of the wind turbine; and setting a generator speed of the wind turbine.

14. A wind turbine comprising a controller configured to control at least one operational parameter of the wind turbine, wherein the controller is configured to:

determine a closed loop Eigen frequency of the controller, wherein the closed loop Eigen frequency is caused by an instability of the controller;

monitor an amplitude of a control signal of a component in the wind turbine outputted by the controller at or near the closed loop Eigen frequency; and upon detecting that the amplitude of the control signal is above a predefined threshold, initiate at least one action for mitigating damage to components of the wind turbine.

15. The wind turbine of claim 14, further comprising a blade pitch actuator, and a sensor to detect a blade pitch angle, wherein the blade pitch angle measured by the sensor is provided as an input to the controller.

16. The wind turbine of claim 15, wherein to determine the closed loop Eigen frequency the controller is configured to:

enter an Eigen frequency detection mode;

while in the Eigen frequency detection mode:

(a) set a controller gain at a predefined starting value;

(b) operate the wind turbine for a predefined period of time, wherein a value of the control signal is recorded during the predefined time period;

(c) adjust the controller gain by a predefined amount at the end of the predefined time period; and (d) continuously repeating steps (b) and (c) until the controller gain reaches a predefined ending value; and based on the recorded values of the control signal in the Eigen frequency detection mode, determine a frequency of the control signal at a greatest gain value set during the Eigen frequency detection mode to be an Eigen frequency of the controller.

17. The wind turbine of claim 16, wherein the controller is configured to enter the Eigen frequency detection mode at a predefined frequency.

18. The wind turbine of claim 15, wherein the at least one action comprises shutting down the wind turbine.

19. The wind turbine of claim 15, wherein the at least one action comprises operating the wind turbine in a safe mode.

20. The wind turbine of claim 15, wherein the at least one action comprises adjusting a gain of the controller.

21. The wind turbine of claim 15, wherein the control signal comprises a control setting for at least one of:

setting a pitch angle of at least one blade of wind turbine; and setting a generator speed of the wind turbine.

* * * * *